US007110761B2

(12) United States Patent
Remes et al.

(10) Patent No.: US 7,110,761 B2
(45) Date of Patent: Sep. 19, 2006

(54) METHOD FOR CONTROLLING ELECTRONIC DEVICE AND ELECTRONIC SYSTEM

(75) Inventors: Jukka Remes, Oulu (FI); Juhani Latvakoski, Haukipudas (FI)

(73) Assignee: Valtion Teknillinen Tutkimuslaitos, Espoo (FI)

( * ) Notice: Subject to any disclaimer, the term of this patent is extended or adjusted under 35 U.S.C. 154(b) by 347 days.

(21) Appl. No.: 10/473,047

(22) PCT Filed: Mar. 26, 2002

(86) PCT No.: PCT/FI02/00258

§ 371 (c)(1),
(2), (4) Date: Mar. 29, 2004

(87) PCT Pub. No.: WO02/084623

PCT Pub. Date: Oct. 24, 2002

(65) Prior Publication Data

US 2004/0233066 A1 Nov. 25, 2004

(30) Foreign Application Priority Data

Mar. 28, 2001 (FI) ................................ 20010645

(51) Int. Cl.
*H04Q 7/20* (2006.01)

(52) U.S. Cl. ............................ 455/432.3; 340/825.69; 359/146; 455/70; 455/66.1

(58) Field of Classification Search ............ 455/432.3; 359/146; 340/825.69
See application file for complete search history.

(56) References Cited

U.S. PATENT DOCUMENTS

| | | | |
|---|---|---|---|
| 4,626,848 A | 12/1986 | Ehlers | |
| 5,255,313 A | 10/1993 | Darbee | |
| 5,646,608 A | 7/1997 | Shintani | |
| 2003/0040334 A1 * | 2/2003 | Lee | 455/557 |

FOREIGN PATENT DOCUMENTS

| | | |
|---|---|---|
| EP | 0974945 | 1/2000 |
| EP | 1 021 035 | 7/2000 |
| EP | 1061490 | 12/2000 |
| JP | 10-322782 | 12/1998 |
| WO | WO 98/20678 | 5/1998 |
| WO | WO 01/71685 | 9/2001 |

* cited by examiner

*Primary Examiner*—Nick Corsaro
*Assistant Examiner*—Diego Herrera
(74) *Attorney, Agent, or Firm*—Young & Thompson

(57) ABSTRACT

Method and apparatus for controlling an electronic device. The method comprises pointing using a pointing device at a link device in order to create a wireless data transmission connection between the pointing device and the link device, and transferring identification data between the pointing device and the link device along the created data transmission connection. Next, a first association between the identification data of the pointing device and the identification data of the link device is formed. After this, a second association between the identification data of the user of the pointing device and the identification data device to be controlled communicating with the link device is formed.

24 Claims, 2 Drawing Sheets

METHOD FOR CONTROLLING ELECTRONIC DEVICE AND ELECTRONIC SYSTEM

FIELD

The invention relates to a method for controlling an electronic device and to an electronic system employing the method.

BACKGROUND

The control of electronic products has developed considerably in recent years. Previously electronic devices, such as televisions or audio equipment, were controlled using wireless remote controls, for instance. Current pointing technologies employ wireless mice or keyboards for controlling a computer. General-purpose remote controls also exist, in which control software can be loaded for controlling the device to be controlled. Studies have also been carried out concerning graspable user interfaces, in which the data of electronic devices is controlled using physical objects symbolizing the data. With the progress of technology a concept of "ubiquitous computing" has been created, which mainly refers to the fact that the data processing capacity previously found only in computers has been transferred to electronic devices by placing microprocessors thereto. What has become a problem is how to intelligently control these very different devices using for instance a single wireless control device.

However, the object of ubiquitous computing, and particularly of a sub-type thereof—context sensitive applications—is to create applications that serve the user, if not automatically, then at least semi-automatically. In order to be able to do this, the applications require context information, or information concerning the user context. When the control of electronic devices is concerned, the context information allows selecting the devices that the user is assumed to be willing to control. The context information can be derived or deduced from a set of different types of data. Such types may include the position of the user or another physical measurement unit associated with the environment. The types also comprise the operations that occur in data processing systems (such as home automation systems), which can thus not be measured. Creating the data needed to form the context information requires a measurement functionality in the user environment systems, and in order to process the measurement results the use of various computationally heavy methods may be required. For example, measurement and determination to be carried out for accurately locating the user is an extremely complex process, particularly in interior surroundings. No solutions are currently known for selecting the device to be controlled, in which context data formed of sensor data is not used.

In brief, the most significant problem is the complexity and costs of creating the data required for forming the context information and of interpreting said context information.

BRIEF DESCRIPTION

It is an object of the invention to provide an improved method for controlling an electronic device and an improved electronic system. As an aspect of the invention there is provided a method according to claim 1 for controlling an electronic device. As another aspect of the invention there is provided an electronic system according to claim 13. The preferred embodiments of the invention are disclosed in the dependent claims.

The invention is based on the idea that context information is simply acquired by physically pointing using a pointing device at a link device connected or belonging to a device to be controlled, and thereafter the device to be controlled and the pointing device can be connected with one another using deduction.

The solution of the invention may replace a complex sensor/location technology using a known simple pointing technique and attaching intelligence thereto in a new fashion. The solution is simpler to implement and therefore more economical than known complex technologies.

LIST OF DRAWINGS

In the following the preferred embodiments of the invention are explained by way of example with reference to the appended drawings, in which.

DESCRIPTION OF EMBODIMENTS

Figure 1:
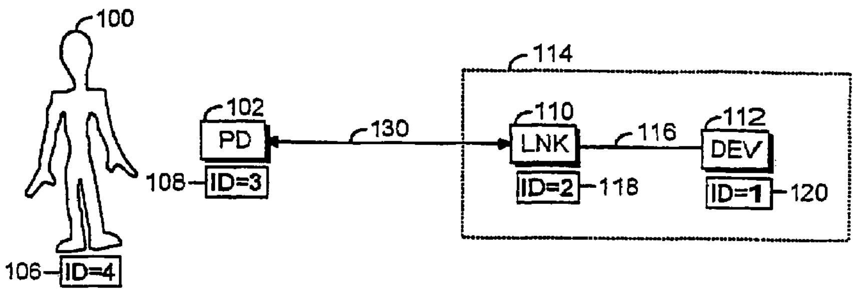
FIG. 1 shows the operational environment where an electronic device is controlled.

With reference to FIG. 1, an operational environment is described, in which an electronic device is controlled. A user 100 has a pointing device 102 used to control an electronic device 112 through a link device 110. A wireless or wired data transmission connection 116 can be established between the electronic device 112 to be controlled and the link device 110. An integrated electronic device 114 is also possible, in which case the link device 110 is integrated to the electronic device 112.

The pointing device 102 may, for instance, be a mobile phone or a PDA device (Personal Digital Assistant) provided with electronics enabling to implement a wireless data transmission connection 130 to the link device 110. Data transmission is based on physical pointing, which here means that the user 100 must perform an active operation, i.e. the user 100 has to point out the link device 102 using the pointing device 102 in order to establish the data transmission connection 130. Pointing is based on utilizing the direction of electric and/or magnetic waves. A known technique for implementing physical pointing is to utilize directed infrared radiation, for instance in accordance with the IrDA standard (the Infrared Data Association). It is apparent to those skilled in the art that also other kinds of known measures for implementing physical pointing can be employed, such as the use of a directed antenna beam known from radio systems.

Electronics is also implemented in the link device 110 that allows implementing the wireless data transmission connection 130 based on physical pointing to the pointing device 102. The data transmission connection 130 is nearly always bi-directional, apart from perhaps some specialized applications, in which a unidirectional data transmission connection may be used, for example in a situation, where the user 100 only provides commands to the electronic device 112 using the pointing device 102 thereof without requiring any acknowledgements concerning the implementation of the control.

In view of the interesting applications, it is important that the user 100, the pointing device 102, the link device 110 and the electronic device 112 include identification data that identifies each device. The identification data must be able to unambiguously distinguish the control parties from one another, even if the requirement for unambiguity may vary. It is sufficient in some applications that the unambiguity is restricted to a particular geographical region, such as the home of the user 100, whereas other applications may require a world-wide unambiguity; for instance if chargeable services are the object of the users 100 control, then the identification data of the user 100 has to be universally unambiguous.

For clarity, the simplified example in FIG. 1 shows the identification data in simplified form, but in reality longer and more complex identification data is generally required. The contents of the user's 100 identification data 106 are referred to as "4". One way to show the user's 100 identification data 106 in the system is to employ a SIM card (Subscriber Identity Module), whereby the SIM card comprises the identification data 106 readable using a card reader in the pointing device 102. The SIM card may also be placed into the card reader of the pointing device 102 permanently or only for the time the reading requires. Other prior art methods for presenting the identity of the user 100 in an electronic system can also be employed.

In our example, the contents of identification data 108 of the pointing device 102 are referred to as "3". An example of the identification data 102 of the pointing device 102 is the international identifier of the device used in a mobile communications systems, but it is apparent that other prior art ways for showing the identity of the pointing device 102 in-an electronic system can also be employed.

The contents of identification data 118 of the link device 110 are referred to as "2". If the data transmission connection 130 is implemented using a radio connection, the base station identifier used in mobile communication systems illustrates an example of the identification data 118, whereby the link device 110 is interpreted as a kind of mini base station.

The contents of identification data 120 of the electronic device 112 are referred to as "1". An example of the structure of the identification data 120 is an address according to the Internet protocol, whereby the electronic device 120 to be controlled may unambiguously be universally identified at the Internet level. One way to implement the universally operating unambiguous identification in the system described would be to employ the address according to the Internet protocol for each part of the system.

The electronic device 112 to be controlled comprises at least one object to be identified with the identification data 120 to which the control is directed. The object to be controlled may itself be an electronic device 112, or then the electronic device 112 may also comprise several objects to be identified with the identification data 120. For example, the electronic device 112, in which the object to be controlled is the device itself, is a television. The electronic device 112 including several objects to be controlled is for instance a computer placed on public premises including various chargeable/chargeless services. It can be noted that depending on the embodiment the object to be controlled is either a physical object or an abstract object. Examples of physical objects are devices (electronic, mechatronic, etc), passive items (toys, tools, furniture, walls, etc.) or physical location (rooms, offices, buildings, work places, street addresses, etc.). Examples of abstract objects include information (schedules, etc.) or services (flight reservation services, etc.).

Figure 2A:
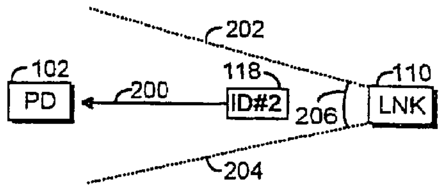
FIG. 2A and 2B show different ways of implementing physical pointing.
Figure 2B:
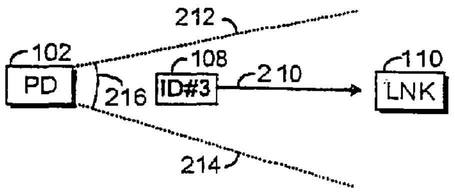

In the following, FIGS. 2A and 2B illustrate different ways to implement physical pointing in an electronic system for creating a data transmission connection between the pointing device 102 and the link device 110, both comprising the identification data 108, 118 identifying the device. The identification data 108, 118 is transferred on a data transmission connection between the pointing device 102 and the link device 110 along the created data transmission connection.

In FIG. 2A the link device 110 transmits the identification data 118 in a directed way in the previously described manner to implement a data transmission connection 200. In the Figure, lines 202 and 204 illustrate the coverage area of the directed transmission 200, or the area, in which the pointing device 102 has to be, in order to be able to receive the identification data 118 sent by the link device 102 on the data transmission connection 200. Thus, the physical pointing of the pointing device 102 towards the link device 110 means that the pointing device is applied to the coverage area of the link device 110 restricted by the lines 202 and 204. In FIG. 2A, the coverage area that the lines 202 and 204 restrict can also be described as an angle 206, i.e. a coverage area is formed of a sector and opens at the angle 206.

In FIG. 2B, the pointing device 102 points at the link device 110, and the pointing device 102 sends the identification data thereof to the link device 110 in a directed transmission 210. Again the coverage are may be described as a sector, whose borders 212 and 214 are opened at an angle 216 towards the link device 110.

The physical pointing is based on the fact that the user 100 knows where the link device 110 is located, or the user 100 may try to find the link device 110 by pointing with the pointing device 102 at such locations, in which the user 100 presumes that the link device 110 is located. Implementing the user interface of the pointing device 102 determines the necessity of the users 100 other operations, or more particularly whether the user 100 needs to perform other active operations in addition to the pointing, such as pressing a key on the pointing device 100 in order to carry out data transmission.

What is achieved with physical pointing is that in an electronic system information is obtained only about events that may interest the user 100. Conventionally the movements of the user 100 have been monitored using different sensor techniques in ubiquitous computing, whereby an enormous amount of data is collected to the system, from which the most relevant and irrelevant data has to be separately determined. Physical pointing can be used to restrict the amount of data to be created.

In the following, with reference to FIGS. 3 and 4, the control of an electronic device is explained as regards the method and the electronic system. The method for controlling the electronic device starts from block 400. Next, in block 402, the pointing device physically points at the link device 110 in order to create a wireless data transmission connection 200, 210 between the pointing device 102 and the link device 110.

Then, in block 404, the identification data 108, 118 is transferred between the pointing device 102 and the link device 110 along the created wireless data transmission connection 200, 210. In data transmission, the process may proceed in accordance with FIG. 2A and/or 2B depending on the situation, i.e. the identification data 108 of the pointing device 102 is transferred to the link device 110 along the created data transmission connection 210 and/or the identification data 118 of the link device 110 is transferred to the pointing device 102 along the created data transmission connection 200. The transfer of the identification data between the devices may thus be a uni-directional transmission of broadcast type, or bidirectional transmission, in which a link is negotiated between the devices, but the identification data is merely transferred in one direction, or bi-directional transmission, in which the identification data is transferred in both directions.

After the transfer of the identification data, a first association is formed between the identification data 108 of the pointing device 102 and the identification data 118 of the link device 110 in block 406. The first association can be created on various locations. The example in FIG. 3 comprises three different alternatives:

1) If the link device 110 has sent the identification data 118 thereof to the pointing device 102, the first association can be created in a control part 330 of the pointing device 102.

2) If the pointing device 102 has sent the identification data 108 thereof to the link device 110, the first association can be created in a control part 332 of the link device 110.

3) Irrespective of the fact whether the pointing device 102 has sent the identification data 108 thereof to the link device 110 and/or the link device the identification data 118 thereof to the pointing device 102, the device 102/110, which as a result-of the data transmission possesses the identification data 108, 118 of both the pointing device 102 and the link device 110, sends said identification data 310 to a separate control part 304 along a data transmission connection 300, 302.

The system comprises means 304/330/332 for forming a first association 312 between the identification data 108 of the pointing device 102 and the identification data 118 of the link device 110. Basically, creating the first association can, irrespective of the desired implementation, be carried out either in one of the devices 102, 110 or in the control part 304 separate from the devices 102, 110. In FIG. 3, method 3 is used of the alternatives described above. The first association 312 is thus created in the separate control part 304. If methods 1 or 2 were used, then the contents of the block described using reference numeral 310 would be the created first association, i.e. the block described using reference numeral 312.

In addition, the electronic system comprises a database 306, in which basic data is stored about the different parts 314 of the system such as the identification data ID#1, ID#2, ID#3, ID#4 of the devices, and associations 316, 318 between different devices. The same holds true for this database 306 as for the separate control part 304, which may either be placed with the pointing device 102, with the link device 110, or separately from said devices. In the example shown in FIG. 3, the database 306 is a separate one, for example in the same device as the separate control part 304, or then still apart from the separate control part 304. What is important is that the control part 330/332/304 to which the logic required in processing is implemented is provided with a data transmission connection to the database 306.

Next, a second association 320 is formed between the identification data 106 of the user 100 of the pointing device 102 and the identification data 120 of the electronic device 112 to be controlled that communicates with the link device 110. The second association 320 is based on the first association 312, on a third association 318 between the identification data 108 of the pointing device 102 stored in the database 306 and the identification data 106 of the user 100, and on a fourth association 316 between the identification data 118 of the link device 110 stored in the database 306 and the identification data 120 of the electronic device 112 to be controlled.

The system thus comprises the means 304 for forming the second association 320 between the identification data 106 of the user 100 of the pointing device 102 and the identification data 120 of the electronic device 112 to be controlled that communicates with the link device 110. The second association 320 is based on the first association 312, on the third association 318 between the identification data 108 of the pointing device 102 received as an input 308 from the database 306 and the identification data 106 of the user 100, and on the fourth association 316 between the identification data 118 of the link device 106 obtained as the input 308 from the database 306 and the identification data 120 of the electronic device 108 to be controlled.

Figure 3:
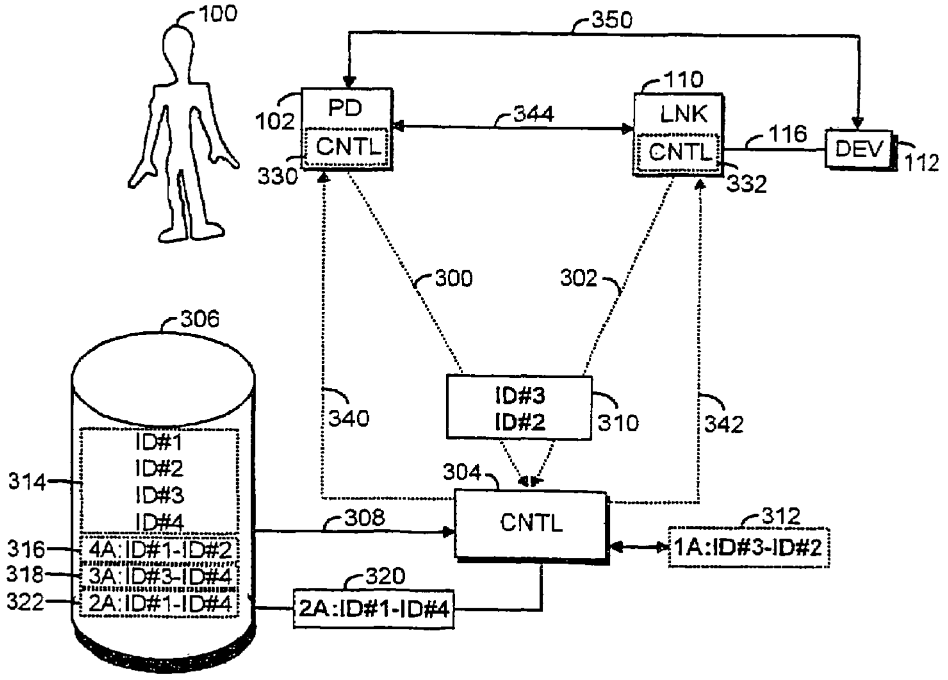
FIG. 3 shows how an electronic device is controlled using physical pointing and intelligence attached thereto.
Figure 4:
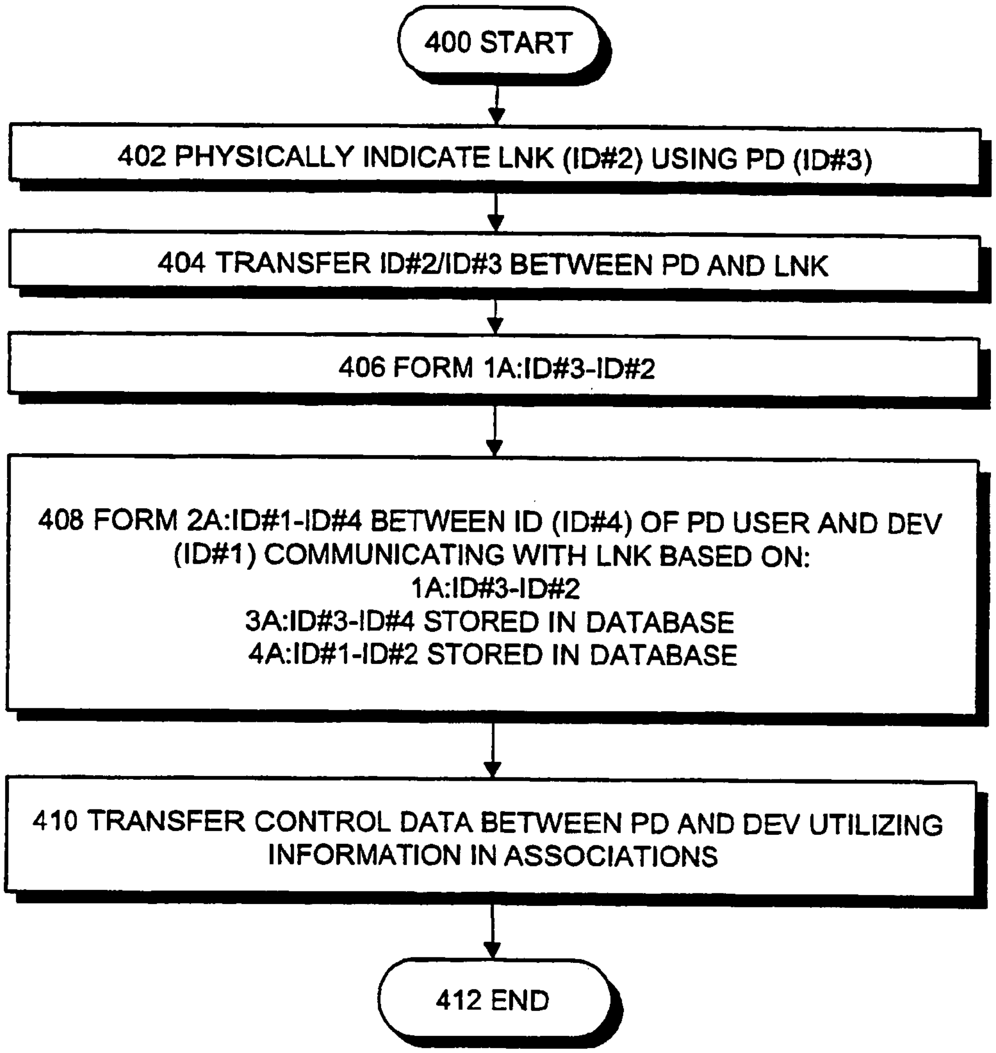
FIG. 4 is a block diagram illustrating a method for controlling an electronic device.

The second association 320 created in accordance with FIG. 3 can be stored in a database 322 as a new record 322. The operation is not necessary, instead the second association can be stored in the permanent memory or in the working memory of the control part 304 as long as it is required.

The data 314, 316, 318 stored a priori in the database 306 is utilized for creating new data 320. The new data, or the second association 320, includes the information that the identification data 106 of the user 100 and the identification data 120 of the electronic device 112 are associated with one another, and such an interpretation may result from this fact that the user 100 is interested in the electronic device 112. The database 306 may also include more of previously stored information concerning the user 100 and the electronic device 112, whereby more complex information can be created concerning the context of the user. This kind of stored additional information comprises data concerning an object placed in the electronic device 112, to which the control is actually directed, for example information about the properties and location etc. of the object. Additional information, such as the time of the pointing, etc., may also be created concerning the pointing operation Finally, in block 410, control data 344 is transferred between the pointing device 102 and the electronic device 110 to be controlled utilizing the information in the associations 312, 316, 318, 320. Furthermore, other information stored in the database 306 can also be utilized. The transfer of the control data is user-specific as described above. The term “user-specific” signifies that the control data is associated with a particular user, who is identified on the basis of the identification data of the user. The user-specificity can also be utilized, as will be described below, so that the control data to be transferred is user-specific in such a sense that it is modified to correspond with the preferences of the user in question. Thus, the system comprises the means 330, 332 to transfer the control data 344, 116 between the pointing device 102 and the electronic device 112 to be controlled utilizing the information included in the associations 312, 316, 318, 322. As is shown in FIG. 3, the required information is transferred from the separate control part 304 to the control part 330 of the pointing device 102 along the data transmission connection 340 and/or to the control part 332 of the link device 110 along the data transmission connection 342. Naturally, if the separate control part 304 is not used, then the required information is only transferred between the control part 330 of the pointing device 102 and the control part 332 of the link device 110. The control is finally ended in block 412 shown in FIG. 4.

In an embodiment, the same data transmission connection is not used for transferring control data that is used for transferring identification data; instead a separate data transmission connection is provided for such a purpose. This separate data transmission connection 350 can also be implemented directly between the pointing device 102 and the device 112 to be controlled, without the data transmission connection 350 having to travel through the link device 110. The data transmission connection 130 used for transferring identification data and the separate data transmission connection 350 can thus be created using different appropriate technologies.

In an embodiment, the physical pointing 200/210 and the data transmission connection 130 required for transferring the identification data can also be separated from one another. The pointing device 102 and the link device 110 are automatically connected to each other using the Bluetooth technology, for instance, whereby the data transmission connection 130 at the radio level is established. The physical pointing 200/210 occurs using one of the methods described above. The physical pointing starts the establishment of the data transmission connection 130 used for signalling, but the identification data 118/108 is transferred along the established data transmission connection 130. The physical pointing 200/210 and the data transmission connection 130 can thus be created using different appropriate technologies.

The general-purpose remote controls are examples of the simplest control applications, in which the above control method can be used. When the object to be controlled has been defined using the described method, the rest can be implemented using prior art methods for implementing an interface.

A simple embodiment is such that the user 100 wants to obtain information about an object in his/her environment. When the object to be controlled is identified by means of the method described, the user 100 may be provided with information about the object, or the electronic device 112, by sending information through the link device 110 to the pointing device 102. Information may be stored in a part of the electronic system that determines the kind of data the user 100 desires concerning the object in question.

Such an embodiment can also be implemented using the method described that the interface of the electronic device 112 to be controlled is retrieved to the pointing device 102, and using said interface in his/her pointing device 102 the user 100 may issue commands to the electronic device 112 and more particularly to the objects to be controlled therein. The system may also comprise stored information that determines the kind of interface that should be offered for a particular type of pointing device 102. An example of such an object to be controlled is the flight reservation system mentioned above.

In an embodiment, the user 100 may have a need to locate himself/herself, either according to his/her own will or by the request of a friend, for example. The user 100 might as described above point at the link device 110 and obtain the information concerning his/her location from the electronic device 112 connected to the link device 110. If desired, the electronic system might transfer the location data to the friend that required such data. No other location system needs to be used, and thus the data protection of the user 100 could more easily be protected if desired.

In an embodiment, a time stamp is attached to the pointing operations, whereby the system becomes aware of the pointing operations that the user 100 typically performs at certain times. If the user 100 does not carry out a certain pointing operation at a particular time, then the system may remind the user 100 about performing such a pointing operation through the pointing device 102.

The described embodiments are preferably implemented as software, whereby the control part 330, the control part 332, the control part 304, the database 306 and the electronic device 112 are microprocessors including the software thereof. The partial equipment implementation can also be implemented, especially using ASIC (Application Specific Integrated Circuit). Those skilled in the art divide the responsibilities of the operations between the different parts of the system as is known in the art and take into account the manufacturing costs, operating costs, and the expensiveness of use and implementation of the data transmission connections, as well as other possibly affecting matters. Some of the functionalities determined above can if desired also be transferred to be carried out using the electronic device 112.

Even though the invention has above been explained with reference to the example in the accompanying drawings, it is apparent that the invention is not restricted thereto but can be modified in various ways within the scope of the inventive idea disclosed in the attached claims.

The invention claimed is:

1. A method for controlling an electronic device comprising:

pointing physically using a pointing device at a link device in order to create a wireless data transmission connection between the pointing device and the link device;

transferring identification data between the pointing device and the link device along the created data transmission connection;

forming a first association between the identification data of the pointing device and the identification data of the link device;

forming a second association between the identification data of the user of the pointing device and the identification data of the electronic device to be controlled communicating with the link device, the second association being based on the first association, on a third association between the identification data of the pointing device stored in a database and the identification data of the user, and on a fourth association between the identification data of the link device stored in a database and the identification data of the electronic device to be controlled; and transferring control data between the pointing device and the electronic device to be controlled utilizing the information in the associations.

2. A method as claimed in claim 1, wherein the identification data of the pointing device is transferred to the link device along the created data transmission connection and/or the identification data of the link device is transferred to the pointing device along the created data transmission connection.

3. A method as claimed in claim 1, wherein the electronic device comprises at least one object to be identified using the identification data to which the control is directed.

4. A method as claimed in claim 3, wherein the object is a physical object or an abstract object.

5. A method as claimed in claim 4, wherein the physical object is a device, a passive item or a physical location.

6. A method as claimed in claim 4, wherein the abstract object is information or a service.

7. A method as claimed in claim 1, wherein the control data to be transferred to the pointing device includes the type of information the user has determined in advance concerning the electronic device.

8. A method as claimed in claim 1, wherein the control data to be transferred to the pointing device includes an interface of the electronic device.

9. A method as claimed in claim 1, wherein the control data to be transferred to the pointing device includes positioning data of the electronic device.

10. A method as claimed in claim 1, wherein a time stamp is attached to the pointing operation.

11. A method as claimed in claim 10, wherein it is deduced on the basis of the time stamped pointing operations which pointing operations the user generally performs at a particular time.

12. A method as claimed in claim 11, wherein if the user does not perform a certain pointing operation at a particular time, then the user is reminded through the pointing device about the performance of the pointing operation.

13. An electronic system comprising a link device for establishing a data transmission connection a pointing device for physically pointing at the link device in order to create a wireless data transmission connection between the pointing device and the link device, the link device and the pointing device comprising identification data identifying the device, and the identification data is transferred over the wireless data transmission connection between the pointing device and the link device, a database, in which associations are stored, means for forming a first association between the identification data of the pointing device and the identification data of the link device;

means for forming a second association between the identification data of the user of the pointing device and the identification data of the electronic device to be controlled communicating with the link device, the second association being based on the first association, on a third association between the identification data of the pointing device obtained as an input from a database and the identification data of the user, and on a fourth association between the identification data of the link device obtained as the input from the database and the identification data of the electronic device to be controlled; and means for transferring control data between the pointing device and the electronic device to be controlled utilizing the information in the associations.

14. A system as claimed in claim 13, wherein the pointing device comprises means for transferring the identification data of the pointing device to the link device along the created data transmission connection and/or the link device comprises means for transferring the identification data of the link device to the pointing device along the created data transmission connection.

15. A system as claimed in claim 13, wherein the electronic device comprises at least one object to be identified using the identification data to which the control is directed.

16. A system as claimed in claim 15, wherein the object is a physical object or an abstract object.

17. A system as claimed in claim 16, wherein the physical object is a device, a passive item or a physical location.

18. A system as claimed in claim 16, wherein the abstract object is information or a service.

19. A system as claimed in claim 13, wherein the control data to be transferred to the pointing device includes the type of information the user has determined in advance concerning the electronic device.

20. A system as claimed in claim 13, wherein the control data to be transferred to the pointing device includes an interface of the electronic device.

21. A system as claimed in claim 13, wherein the control data to be transferred to the pointing device includes positioning data of the electronic device.

22. A system as claimed in claim 13, wherein the system comprises means for attaching a time stamp to the pointing operation.

23. A system as claimed in claim 22, wherein the system comprises the means for deducing on the basis of the time stamped pointing operations which pointing operations the user generally performs at a particular time using the pointing device thereof.

24. A system as claimed in claim 23, wherein the system comprises the means for reminding the user through the pointing device about the performance of the pointing operation, if the user does not perform a certain pointing operation at a particular time using the pointing device thereof.

* * * * *

UNITED STATES PATENT AND TRADEMARK OFFICE

CERTIFICATE OF CORRECTION

PATENT NO. : 7,110,761 B2 
APPLICATION NO. : 10/473047
DATED : September 19, 2006
INVENTOR(S) : Jukka Remes et al.

It is certified that error appears in the above-identified patent and that said Letters Patent is hereby corrected as shown below:

On the title page, please amend Item (73) to read as follows:
--(73) Assignee: Valtion Teknillinen Tutkimuskeskus, Espoo (FI)--.

Signed and Sealed this

Thirtieth Day of October, 2007

JON W. DUDAS
*Director of the United States Patent and Trademark Office*